July 7, 1925.

E. A. MEACHAM

FRUIT PITTER

Filed Jan. 29, 1924

Inventor
Ernest A. Meacham
By Lyon & Lyon, Attorney

July 7, 1925. 1,545,003
E. A. MEACHAM
FRUIT PITTER
Filed Jan. 29, 1924 4 Sheets-Sheet 2
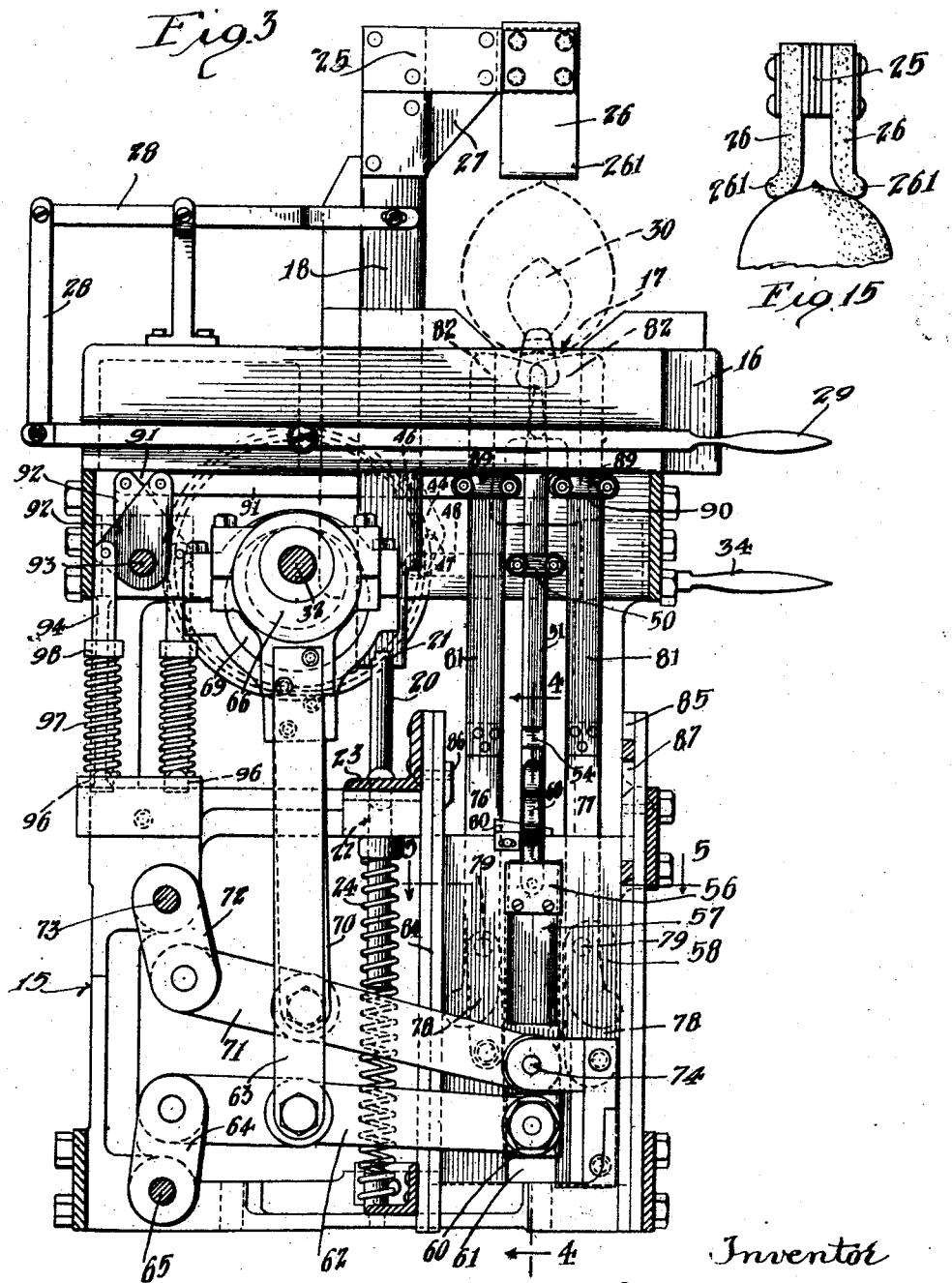
Inventor
Ernest A. Meacham
By Lyon & Lyon
attys

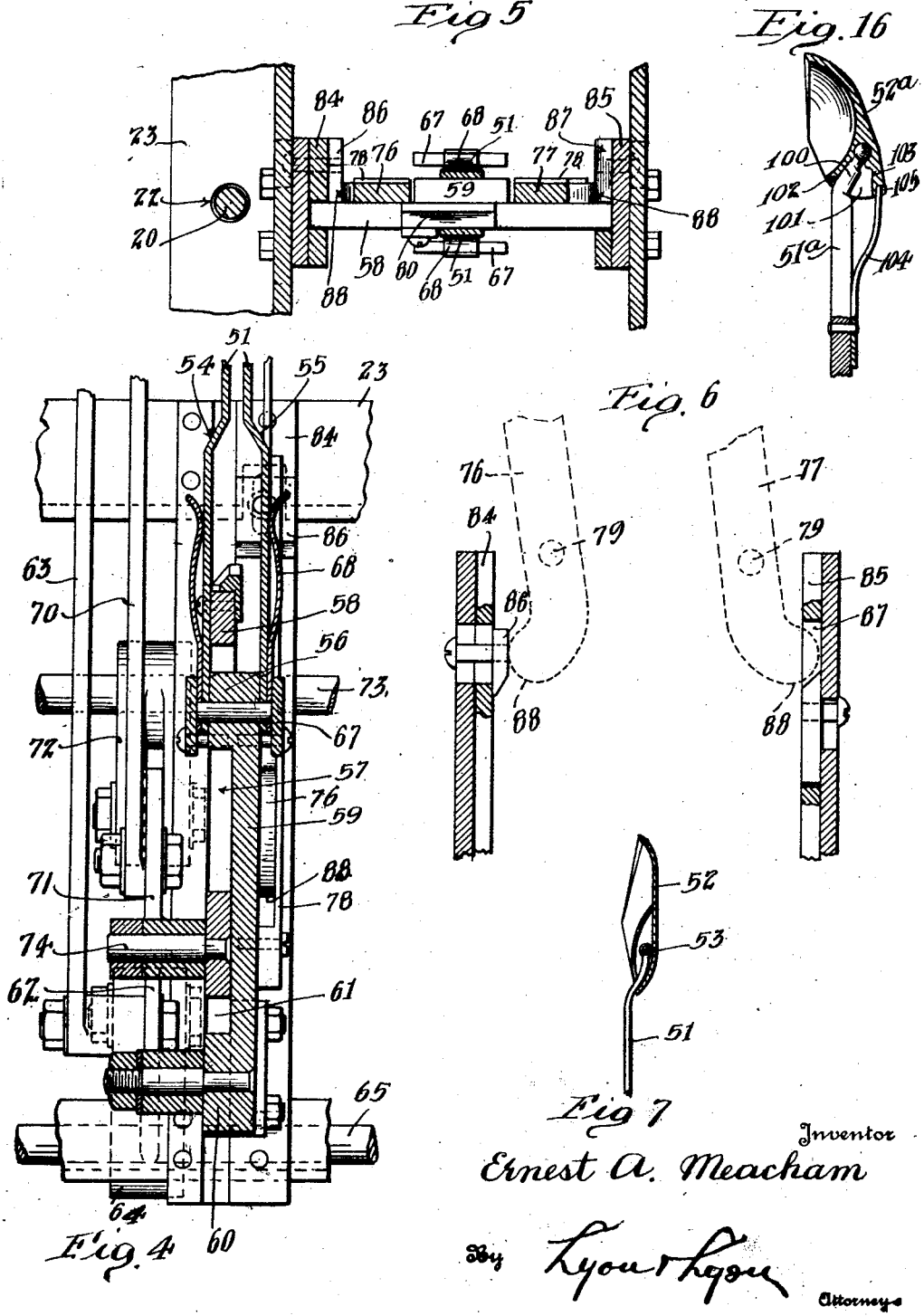

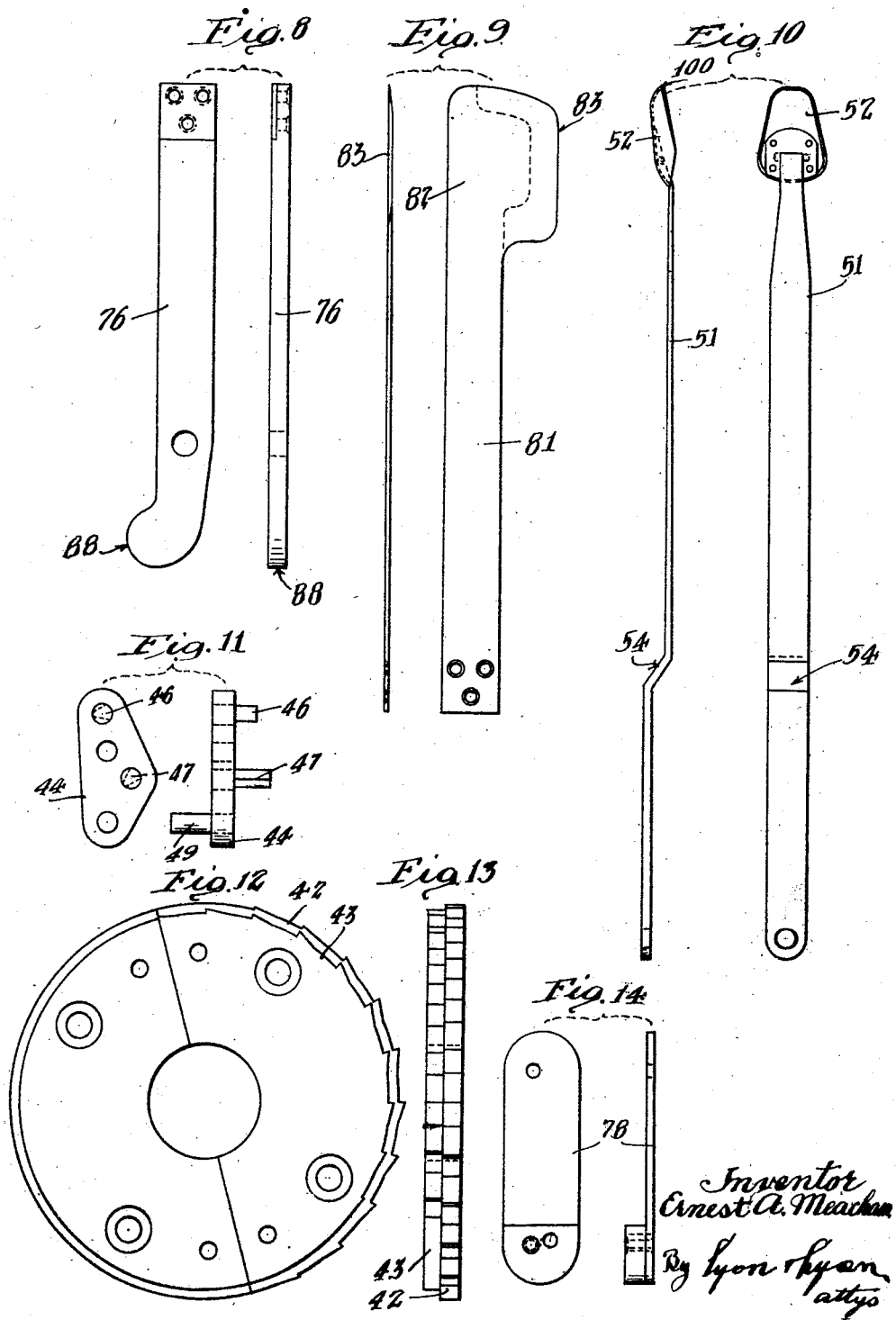

Patented July 7, 1925.

1,545,003

UNITED STATES PATENT OFFICE.

ERNEST A. MEACHAM, OF OAKLAND, CALIFORNIA, ASSIGNOR TO CALIFORNIA PACKING CORPORATION, OF SAN FRANCISCO, CALIFORNIA, A CORPORATION OF NEW YORK.

FRUIT PITTER.

Application filed January 29, 1924. Serial No. 689,263.

*To all whom it may concern:*

Be it known that I, ERNEST A. MEACHAM, a citizen of the United States, residing at Oakland, in the county of Alameda and State of California, have invented a new and useful Fruit Pitter, of which the following is a specification.

This invention relates to a machine for removing the "pits" or "stones" from the interior of fruit; and more particularly to a device for cutting the "pit" free from the flesh of the fruit and ejecting the pit therefrom.

In the past, in preserving of fruits it has been very difficult and expensive to remove the "pits" from the center of the fruit and all the machines or devices heretofore proposed, designed or constructed have been limited to fruit that have pits or stones of a definite contour and because of this have been very limited in their employment.

It is, therefore, an object of this invention to provide a machine by which the pits may be economically and quickly removed from the respective fruit specimens regardless of the variation in size and shape of the pits.

An object of this invention is to provide a fruit pitting machine which shall be easily and effectually controlled by the operator.

An object of this invention is to provide a machine that will remove the pit from the fruit without damaging the fruit or cutting a large portion of the flesh therefrom.

An object of this invention is to provide a machine for carrying out the above named objects that is economical to construct, and is compact and relatively small in size.

Further objects of this invention will appear in the following detailed description of which the accompanying drawings are a part.

In the drawings:

Fig. 3 is a side elevation partly in section taken largely on the line 3—3 of Fig. 2.

Fig. 4 is a sectional elevation taken substantially on the line 4—4 of Fig. 3.

Fig. 5 is a sectional plan view taken substantially on the line 5—5 of Fig. 3.

Fig. 6 is a detail section of the knife handle guide plates showing the knife guiding levers in their uppermost position in dotted lines.

Fig. 7 is a sectional view of a spoon constructed in accordance with this invention and showing the pivotal construction of the spoon bowl on the shank.

Fig. 8 is a detail view showing a side and an end elevation of a lower cam of guiding lever of knives.

Fig. 9 is a detail view showing a side and end elevation of a knife blade and shank.

Fig. 10 is a side and end elevation of the spoon constructed in accordance with this invention, showing in particular the construction of the shank.

Fig. 11 is a side and an end elevation of the cam operated rocker, showing a particular construction of its cam contact pins.

Fig. 12 is a side elevation of the cam wheels used in connection with the cam rockers shown in Fig. 11.

Fig. 13 is an edge elevation of the cam wheels of Fig. 12.

Fig. 14 is a detail view showing a side and an end elevation of bearing yokes used in connection with this invention.

Fig. 15 is an end elevation of the pads in contact with the fruit.

Fig. 16 is a sectional view of a modified form of spoon.

Figure 1:
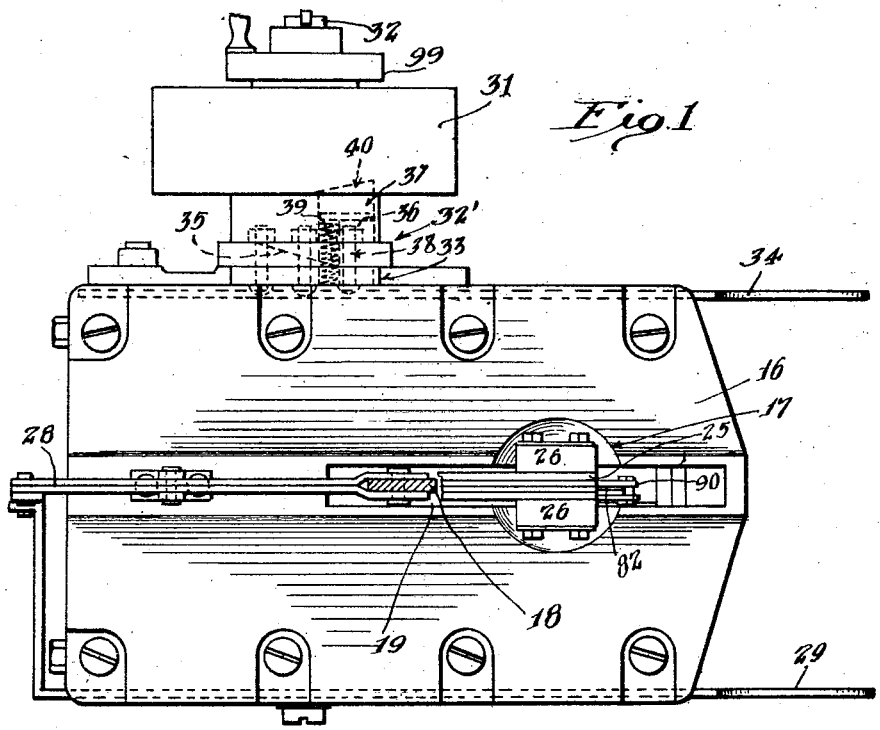
Figure 1 is a plan view of a peach pitter constructed in accordance with this invention.
Figure 2:
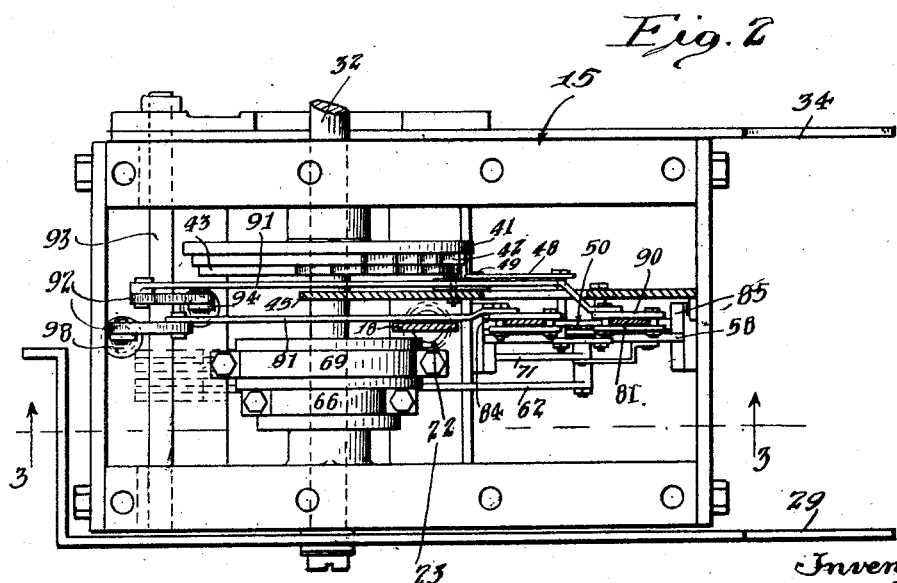
Fig. 2 is a plan view similar to Fig. 1 with the top casting, the clutch, and the driven pulley removed.

In the drawings 15 indicates the frame having a removable cover 16; a spherical hole 17 is cored or otherwise drilled in the cover 16 into which hole 17 the fruit is positioned; for holding the fruit in position I prefer to employ the following construction.

A member 18 is adapted to slide in a slot 19 in the cover, said member is securely fixed to a shaft 20 as indicated at 21; the shaft is adapted to slide in a drill hole 22 in the horizontal frame member 23. A spring 24 is positioned on said shaft and secured to the lower portion of the frame in such a manner as to hold the peach gripping device normally away from the peach as clearly shown in Fig. 3 of the drawings. Secured to the upper portion of the member 18 are the plates 25, which plates are riveted or otherwise secured to a pair of pads or plates 26 which are preferably of rubber with curved contact faces 261 spaced to permit of the insertion between them of slitting knives and spoons to be more fully described hereinafter.

In connection with this gripping device I also provide a pair of bent bracing members 27 to insure a rigid connection between the members thereof.

To operate this gripping device I provide a series of pivoted members 28 operable by pushing the handle 29 to cause the member 18 to be moved downwardly which action results in the gripping and holding of the fruit in position for the removal of the pit 30. For this pitting, I provide the following arrangement of parts:

The power is transmitted from any suitable source (not shown) to the belt pulley 31, which pulley is loosely journaled on the drive shaft 32. The pulley 31 is rotating at all times when the machine is in use and the power is transmitted to the mechanism by means of connecting the said rotating pulley to the shaft through operation of a punch press clutch 32', having an annular groove 33 adapted to run on a clutch control bar 34 said bar being pivoted to the frame 15; having a wedge shaped terminal 35 angular to the walls of the groove and adapted to move a notched pin 36 axially parallel to the shaft within a recess 37 within the clutch member 38 by engaging the notch of the pin 36. The end of said pin 36 when withdrawn by the wedge 35 forms a flush surface with the edge of the clutch member 38 and when the bar is lifted out of the clutch radially, the pin 36 is thrust by the action of a spring 39 longitudinally in extension of the end surface of the clutch member 38 to engage a recess 40 in the loose pulley 31.

Keyed to the drive shaft 32 is a cylindrical plate 41 to which a cam wheel 42 is adapted to be secured; a second cam wheel 43 is adapted to be secured to the cam wheel 42. A rocker lever 44 is pivoted to the frame plate 45 and has two cam contact pins 46 and 47 which are adapted to ride alternately on the raised cam surfaces of the wheels 42 and 43; the pivot point being located between the two contact pins 46 and 47 to give a horizontal reciprocating motion to a link arm 48 which is pivoted to the rocker lever at 49.

The link 48 is connected at its extreme end to a slide member 50 through which pitting spoon handles 51 are adapted to slide.

The cam wheels shown in the drawings are serrated for only one-half of the circumference, the oscillating action required of the spoon being completed in a half revolution thereof.

Referring to Figs. 7 and 10, it will be clearly seen that the bowls 52 have sharpened edges 100. These bowls are pivoted at 53 to handles 51 so as to allow the spoon bowls to rock forward and back in relation to the said handles so that when the spoons are forced upward through the fruit and engage the pit thereof, they will travel along the surface of the pit while cutting the flesh therefrom. This action is accompanied by the oscillation of the spoons caused by the action of the rocker contact pins 46, 47 on the cam wheels 42, 43. By this action of the spoon bowls 52 the pit is cut from the fruit without cutting away the flesh of the fruit.

The spoon handles are bent outwardly from each other forming shoulders 54 and 55 of the spoons. The handles of the spoons, continued from the shoulders 54, 55 in a spaced relation, are secured to a slide member 56 adapted to slide in a guideway 57 formed in the knife actuating member 58.

The slide 56 is a portion of the spoon actuating member 59 as shown in Fig. 4. The member 59 forms a slide 60 which is adapted to slide in a second guideway 61 of the member 58. The slide 60 is pivoted to a lever 62 which is in turn pivoted to an eccentric connecting rod 63. By means of a connecting member 64, pivoted to the frame 15 on a shaft 65, the lever 62 is pivotally held in a position to cause the spoon 52 to travel vertically.

The eccentric connecting rod 63 is secured to an eccentric 66 which is keyed to the shaft 32. The connections provided at the base of spoon shanks allow by their pivotal relation a partial rotation of the spoon handles 51 in a horizontal plane, in addition to the oscillation or rocking of the bowls 52 as actuated through the rocker lever 44, as heretofore described.

The slide 56 to which the pitting spoon handles 51 are pivoted is guided in the slideway 57 by the guide plates 67 which are securely riveted thereto. The spoon handles 51 are pressed toward each other by springs 68, secured between guide plates 67 and the guide 56.

Keyed to the drive shaft 32, having a greater eccentric action than that of the eccentric 66, is a second eccentric 69 pivotally connected through the rigid eccentric connecting rod 70, to the lever 71, which lever 71 is pivotally connected at one end to a pivot member 72 pivoted to a shaft 73 journaled on the frame; at its other end, the member 71 is pivoted to the member 58, as shown at 74.

Pivoted at 79 to member 58 are knife shank members 76 and 77 which are held in position by the yokes 78, said yokes being secured at the pivot 79 and to the plate 58. The yokes 78 are so positioned as to give additional bearing to the knife shanks to hold the knives in vertical position.

Secured to the upper portion of the member 58 is a shoulder 80 which is adapted to engage the shoulder 54 of the left hand spoon to move the same away from engagement with the pit when the said pit has been completely cut away from the flesh of the fruit.

The lower shank members 76 and 77 are securely riveted to the upper knife shank members 81 which members are forged to form the knife blades 82 having sharp edges 83 as clearly shown in Fig. 9 of the drawings.

The lower ends of the shank members 76 and 77 have the cam shaped surfaces 88 which form the bearing on the frame plates 84 and 85 members to hold the knives in the desired position, by fulcruming on the pivots 79.

On the member 84 is positioned an adjustable cam surface member 86 which is adapted to force the lower end of the shank 76 outward and disengage the knife blades 82 from the pit 30.

In the member 85 there is provided a slot 87 adapted to receive the cam 88 of the knife shank to permit the knife blade 77 to be thrown toward the pit of the fruit and thereby eject the pit from the fruit after the pit has been released from engagement with the spoons as above described. In order to permit the timing of this action, the member 85 is adjustably secured on the outer frame member.

In order to hold the knives with their edges in contact with the pit, in the position shown in the dotted lines of Fig. 3, the upper knife shanks 81 are adapted to slide in the slideways 89 which slideways 89 are formed of plates 90 and rocker connecting rods 91 spaced apart by any suitable means. The rocker connecting rods 91 are pivoted at their extreme ends to rocker members 92 pivoted on the shaft 93 journaled to the frame. Pivoted to the rocker members 92 at their opposite ends are the members 94 which slide in slots 96 in the frame. Helical springs 97 are positioned on the members 94 and held in position between the frame and the collars 98, secured to the members 94. The springs are so positioned that by their tension on the knives they are either held in the position shown in Fig. 3 or in contact with the pit.

For manual operation of this machine, I prefer to provide a hand wheel 99 shown in Fig. 1 and keyed to the shaft 32.

The operation is as follows:

The operator with his right hand places the fruit in the detent or cored spherical hole 17 in the cover 16 so that the exposed ends of the spoon bowls 52 pierce the flesh of the fruit, one on either side of the base of the pit 30, and with the "seam" of the fruit and pit approximately in the plane of the slitting knives. With the left hand, the operator holds the fruit in this position by pushing downward on the handle 29 of the gripping mechanism, which action results in the gripping plates 26 engaging the fruit. With his right hand the operator trips the clutch 32 by a downward stroke on the clutch lever 34, which induces the following operation by one rotation of the drive shaft 32:—

The slitting knives are thrust upward through the flesh of the fruit in the plane of the "seam," the edges of said knives being held in contact with the pit by the pressure of the spring 97 as heretofore described. At the top of the upward stroke of the knives the back knife blade 83 is mechanically held out of contact with the pit, by the action of the cam surface 78 on the shoulder 86 as fully described above, to allow the spring action on the forward knife to thrust the pit out from the peach between the spoons. During the same upward thrust of the knife the spoons are thrust upward through the flesh of the fruit adjacent to the pit, their paths being determined by the following factors:

A. Upward thrust of the spoons by slide.

B. Oscillation (forward and back) actuated by cam wheels as fully described above.

C. Partial rotation on an approximately vertical axis, which rotation is induced by the lateral sliding of the concave spoons on the convex fruit pit surface.

D. Partial rotation on an approximately horizontal axis parallel to the seam of the fruit as fully described in connection with the pivot of the spoon bowl on the shank thereof.

The factors C and D result from the action of the concave surface of the spoon being moved in contact with the convex surface of the pit of the fruit so held in contact by the action of the springs 68 on the spoon shanks. The combination of these forces produce a ball and socket contact of the pit and the spoons; the oscillation of the spoons gives a shearing action to their cutting edges, which action is superior to a mere thrust. At the top of the upward thrust of the knives the flesh of the fruit has been slitted on an approximately central plane and the pit has been separated from the flesh of each half and thrust therefrom by the action of the knives as described above. The said operator now releases the pressure on the gripper lever and the halves of the fruit are free to fall away laterally on the inclined top surface of the cover plate. The shaft 32 has been rotated once and one complete pitting cycle has been concluded.

In Figure 16 I have shown a modification of the spoon, the spoon handle being indicated at 51$^a$, the bowl at 52$^a$ and the joint between the bowl and handle being formed by a ball 53$^a$ and socket 53$^b$. The ball is connected with the main portion of the handle by an angularly extending neck 100 of circular cross section which fits a slot 101 in the spoon bowl. This enables the spoon bowl to be turned in two different planes that lie at a right angle to each other. When the bowl is turned lengthwise the side walls of the slot 101 engage the opposite sides of the neck 100 thus to guide the bowl in this movement. The opposite ends 102, 103 of the slot constitute stops to limit this movement. When the bowl is turned edgewise the slot 101 turns on the neck 100. A flat spring 104 is connected at one end with the handle 51ª and has its other end engaged in a notch 105 in the bowl. This spring yieldingly holds the bowl in one position and permits it to be turned to different positions relative to the handle, when the bowl contacts with the different portions of the fruit pit.

It is to be noted that the cutting edges of both forms of spoons described above are at the convex surface of the spoon so that said edges will not contact with any portion of the irregular-shaped pit when the bowl is operating about the pit.

Having fully described a preferred embodiment of this invention and the operation in connection therewith, it is to be understood that I do not wish to limit myself to the specific construction herein disclosed which may be varied at will without departing from the spirit of this invention as pointed out in the following claims.

I claim:

1. In a machine for pitting fruit, the combination of a pitting spoon fashioned to conform to the curvature of a fruit pit, and means for operating the spoon to conform to the curvature of a fruit pit while cutting the flesh of the fruit from the pit.

2. In a machine for pitting fruit, the combination of a plurality of oscillating spoons, a plurality of slitting knives, means for operating the slitting knives to slit the fruit, and means for thrusting the spoons through the flesh of the fruit so as to conform to the curvature of the pit.

3. In a machine for pitting and halving fruit, the combination of pitting spoons, slitting knives, and means for operating said knives and oscillating said spoons.

4. In a machine for pitting and halving fruit, the combination of pitting spoons, slitting knives, means for oscillating and for imparting rotary motion to said spoons to cause the same to cut the flesh of the fruit from the pit while following the curvature of the pit, and means for operating said knives.

5. In a machine for pitting fruit, the combination of pitting spoons, means for holding the fruit, and means for imparting an oscillatory and rotary motion to the spoons for causing the said spoons to follow the curvature of the pit while cutting the same from the flesh of the fruit.

6. In a machine for pitting fruit, the combination of cam wheels, a rocker lever operated by said cam wheels, a connecting link, and pitting spoons oscillated thereby.

7. In a machine for pitting fruit, the combination of cam wheels, a pawl operated by said cam wheels, a connecting link, pitting spoons oscillated thereby and means for simultaneously imparting a rotary motion to said spoons.

8. In a machine for pitting fruit, the combination of pitting spoons, means to oscillate said spoons, means for imparting rotary motion to said spoons and means for causing the spoons to cut the flesh of the fruit from the pit.

9. In a machine for pitting fruit, the combination of pitting spoons, means for imparting a combined oscillatory and rotary motion to said spoons while causing said spoons to cut the flesh of the fruit from the pit.

10. In a machine for pitting fruit, the combination of pitting spoons, means for imparting a combined oscillatory and rotary motion to said spoons while causing said spoons to cut the flesh of the fruit from the pit, the path of movements of said spoons conforming to the curvature of the fruit pit.

11. In a machine for pitting and halving fruit, the combination or oscillating and rotating pitting spoons, slitting knives, means for holding the fruit during the pitting and slitting operation and means for oscillating and rotating the pitting spoons.

12. In a machine for pitting and halving fruit, the combination of an oscillating pitting member, a slitting knife, means to hold the fruit in a predetermined position during the operation of said member and knife, means for oscillating the pitting member and means for operating the slitting knife.

13. In a machine for pitting and halving fruit, the combination of pitting members having sharp edges, means for simultaneously imparting oscillatory and rotary motion to said pitting members while forcing said members into the fruit to cut the flesh of the fruit from the pit, and slitting knives operable in the same plane as the pitting members.

14. In a machine for pitting and halving fruit, the combination of pitting members having sharp edges, means for simultaneously imparting oscillatory and rotary motion to said pitting members while forcing said members into the fruit to cut the flesh of the fruit from the pit, slitting knives operable in the same plane as the pitting members, and means for positioning and holding said fruit.

15. In a machine for pitting and halving fruit, the combination of pitting members, means for oscillating said members comprising cam wheels, a pawl and a connecting link, means for imparting rotary motion to said pitting members, splitting knives, means to thrust said knives through the fruit, and means to hold said knives in contact with the pit of the fruit.

16. In a machine for pitting and halving fruit, the combination of pitting means, splitting knives, means to thrust said knives through the fruit and means holding said knives in contact with the pit of the fruit, and means for operating one of said knives to eject the fruit after the splitting of the fruit and the cutting of the pit from the flesh of the fruit by said pitting members.

17. In a machine for pitting and halving fruit, the combination of pitting members, means for imparting oscillating and rotary motion to said members, splitting knives, means for actuating said knives to split the fruit and hold said knives in contact with the pit during the oscillating and rotary motion of the pitting members, and means for ejecting the pit upon the completion thereof.

18. In a machine for pitting fruit, the combination of pitting spoons, means to oscillate the spoons in planes toward and from the pit of the fruit and to impart rotary motion in planes transverse to the planes of said oscillatory motion.

19. In a machine for pitting fruit, the combination of a plurality of pitting spoons, each spoon comprising a shank, a concave spoon bowl, and means pivotally connecting the spoon bowl to the shank.

20. In combination in a fruit pitting machine, oscillating concave spoon bowls, means to move said spoons longitudinally into the fruit, means to hold said spoons in contact with the pit, means for splitting the fruit and means for ejecting the fruit pit.

21. In a fruit pitting machine, the combination of means for holding the fruit, means for splitting the fruit, pitting spoons, means for imparting oscillatory and rotary motion to said pitting spoons while moved in contact with the fruit pit for cutting the flesh of the fruit from the fruit pit, and means for ejecting the fruit pit.

22. In combination in a fruit pitting machine, oscillating spoons including shanks having a shoulder and pivoted concave spoon bowls, means to move said spoons longitudinally into the fruit, means to hold said bowls in contact with the fruit pit, means for engaging said shoulder to move one of said spoons away from said pit and means for ejecting the pit.

23. In combination in a fruit pitting machine, oscillating spoons, slitting knives, means for thrusting said knives through the fruit and holding said knives in engagement with the pit and means to actuate said knives and spoons to cause ejectment of the pit.

24. In combination in a fruit pitting machine, means for clamping the fruit in a predetermined position, oscillating spoons, means for moving said spoons into the fruit in contact with the pit thereof, means for operating said clamping means and for disengaging the said clamping means when said spoons have completed cutting the flesh of the fruit from the pit.

25. In a fruit pitting machine, the combination of means for clamping the fruit in a predetermined position, oscillating pitting spoons, means for oscillating and rotating said spoons, means for moving said spoons into the fruit in contact with the pit thereof thereby cutting the flesh of the fruit from the pit, means for operating said clamping means and means to disengage the clamping means when said operating means is released.

26. In a fruit pitting machine, the combination of slitting knives, each comprising a blade portion and a shank and a lever secured to said shank having curved bearing surfaces, guideways for said curved bearing surfaces to hold the knives in approximately vertical alinement, one of the guideways having a shoulder and the other a slot, and means to thrust the knives upwardly to effect engagement of the curved bearing surfaces with the shoulder and slot respectively.

27. In a fruit pitting machine, means for holding the fruit, means for splitting the fruit, means including pitting spoons having oscillatory and rotary motion while moved in contact with the fruit pit for cutting the flesh of the fruit from the fruit pit, and means for ejecting the fruit pit.

28. In a machine for pitting fruit, the combination of pitting spoons, means for thrusting the spoons into the fruit and for concurrently imparting a combined oscillatory and rotary motion to said spoons.

29. In a machine for pitting fruit, the combination of pitting spoons, means for thrusting the spoons into the fruit and for concurrently imparting a combined oscillatory and rotary motion to said spoons, the path of movements of said spoons conforming to the curvature of the fruit pit.

30. In a machine for pitting fruit, the combination of means for holding the fruit, a plurality of pitting spoons, each spoon comprising a shank, a concave spoon bowl movably connected with said shank, said bowl having a sharpened edge terminating in a point, and means for thrusting the spoon into the fruit.

31. In a machine for pitting fruit, a pitting spoon comprising a shank member, and a concave spoon bowl connected by a ball and socket joint to the shank member, 32. In a machine for pitting fruit, the combination of a fruit receiving recess, a plurality of pitting spoons, means for holding the fruit within the recess, means for imparting a rotary motion to said spoons, means to oscillate said spoons, and means for causing the spoons to cut the flesh of the fruit from the pit.

33. In a machine for pitting fruit, the combination of a recess, means for holding the fruit in the recess, said means comprising resilient contact pads, a plurality of pitting spoons, slitting knives, and means for operating said knives and said pitting spoons.

34. In a machine for pitting fruit, the combination of a frame, a cover for the frame, fruit receiving recesses formed in the cover, pitting spoons, slitting knives, means for holding the fruit in the recess, and means for thrusting said knives and oscillating said spoons.

35. In a machine for pitting fruit, the combination of a frame, a fruit receiving recess, means for holding the fruit in the recess, a drive shaft journaled in the frame, a plurality of pitting spoons, a plurality of slitting knives, means driven from the drive shaft for oscillating and for imparting rotary motion to said spoons to cause the same to cut the flesh of the fruit from the pit while following the curvature of the pit, and means for operating said knives.

36. In a machine for pitting and halving fruit, the combination of pitting spoons, slitting knives, means for operating said knives and said oscillating spoons, said latter means comprising driven eccentrics, means for connecting one of the eccentrics with the spoons and one of the eccentrics with the knives, cam wheels, a pawl rotated by said cam wheels, a connecting link connecting the pawl with the spoons whereby an oscillatory movement is imparted to the spoons, and means for simultaneously imparting a rotary motion to said spoons.

Signed at San Francisco, California, this 21st day of January 1924.

ERNEST A. MEACHAM.